United States Patent [19]

Tracy et al.

[11] Patent Number: 5,528,370
[45] Date of Patent: Jun. 18, 1996

[54] APPARATUS AND METHOD FOR MEASURING VARIATIONS IN THICKNESS OF AN OPTICAL INTERFERENCE ELEMENT

[75] Inventors: David Tracy; Paul G. Saviano, both of Norwalk, Conn.

[73] Assignee: The Perkin-Elmer Corporation, Norwalk, Conn.

[21] Appl. No.: 412,804

[22] Filed: Mar. 29, 1995

Related U.S. Application Data

[63] Continuation of Ser. No. 74,568, Jun. 9, 1993, abandoned.

[51] Int. Cl.⁶ ............................. G01B 11/02; G01B 9/02
[52] U.S. Cl. ...................... 356/355; 356/352; 356/356; 250/550
[58] Field of Search ..................... 356/345, 354, 356/355, 356, 352; 250/550

[56] References Cited

U.S. PATENT DOCUMENTS

| | | | |
|---|---|---|---|
| 3,588,254 | 6/1971 | Rhoades | 356/106 |
| 3,588,462 | 6/1971 | Kreckel | 235/92 |
| 4,124,300 | 11/1978 | Mead et al. | 356/355 |
| 4,139,302 | 2/1979 | Hung et al. | 356/32 |
| 4,169,980 | 10/1979 | Zanoni | 250/550 |
| 4,410,273 | 10/1983 | Mantz et al. | 356/319 |
| 4,436,424 | 3/1984 | Bunkenburg | 356/356 |
| 4,609,822 | 9/1986 | Roche | 250/352 |
| 4,964,726 | 10/1990 | Kleinknecht et al. | 356/355 |
| 5,159,412 | 10/1992 | Willenborg et al. | 356/355 |
| 5,313,265 | 5/1994 | Hayes et al. | 356/355 |
| 5,327,217 | 7/1994 | Kanai et al. | 356/355 |
| 5,327,220 | 7/1994 | Erickson | 356/355 |

Primary Examiner—Rolf Hille
Assistant Examiner—David Ostrowski
Attorney, Agent, or Firm—Herbert S. Ingham; Edwin T. Grimes

[57] ABSTRACT

In a system for measuring variations in thickness of an optical etalon, a light source and a diffraction grating are mounted on a base structure with an axle. A lever arm is affixed to the axle, and a micrometer is held in contact with the lever arm. The grating directs a into an optical path a wavelength of radiation dependent on orientation of the grating. The etalon is supported in the optical path to effect a fringe pattern representing variations in thickness of in the etalon. The orientation is varied with the micrometer so as to vary the wavelength to the etalon and thereby positioning of the fringe pattern across the etalon which is viewed through a microscope. The micrometer measures the variation of orientation and thereby variation in thickness across the interference element.

15 Claims, 2 Drawing Sheets

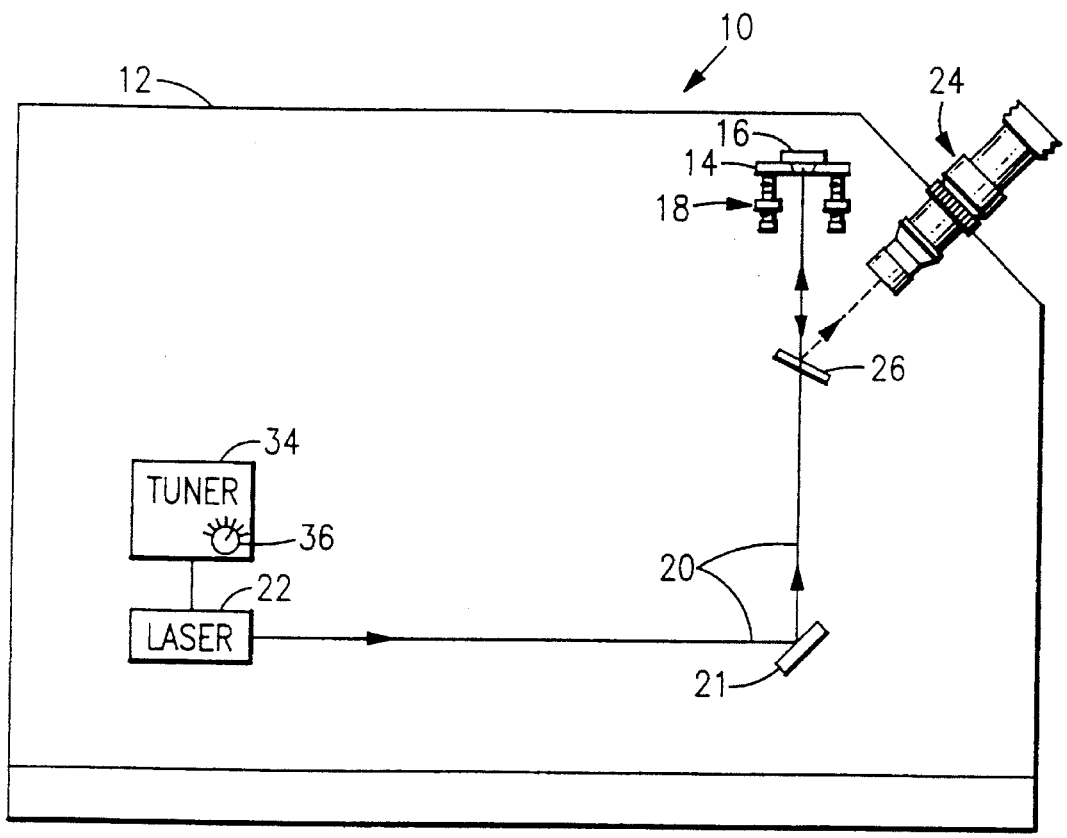
FIG.1
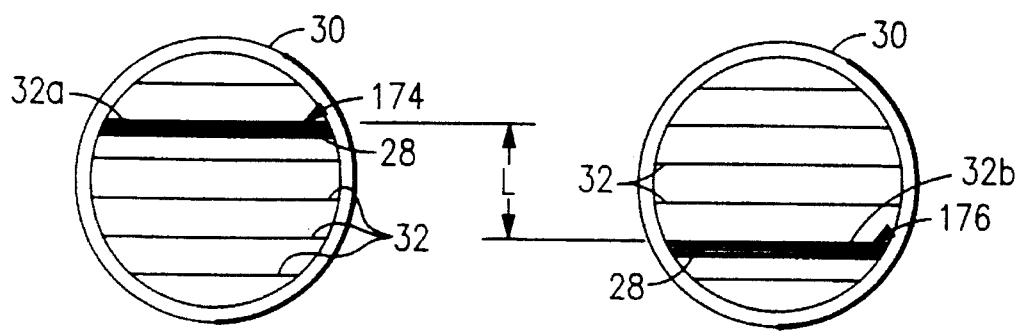
FIG.2a
FIG.2b

APPARATUS AND METHOD FOR MEASURING VARIATIONS IN THICKNESS OF AN OPTICAL INTERFERENCE ELEMENT

This is a continuation of application Ser. No. 08/074,568 filed on Jun. 9, 1993 now abandoned.

This invention is directed to optical interference elements such as etalons, and particularly to measurement of variations in the thickness of such elements.

BACKGROUND OF THE INVENTION

Optical elements of various types usually require a high degree of perfection for one or more of the optical surfaces. One type of precision surface is a flat or curved lens or mirror surface. Another example is a Fabry-Perot etalon that is used as an interferometer for production of interference fringes in an optical instrument. One such etalon is a high finess etalon formed of a thin polymer film, e.g. 16 microns thick, with a semi-reflective gold coating thereon. Another such etalon is a low finess etalon consisting of a silica plate, e.g. 50 microns thick. A more complex etalon with multiple surfaces is disclosed in U.S. Pat. No. 4,609,822. Etalons, as generally known in the art, provide interference fringes for an instrument via reflections between at least two surfaces of the etalon. The surfaces must be flat and parallel with high precision. It can be difficult to manufacture optical elements with a degree of required perfection. Therefore it is desired to test such elements for variations across the surface or surfaces.

Inspections for contours of optical surfaces are typically effected by way of interference fringes. A monochromatic beam of radiation incident on a sample surface is doubly reflected in such a manner as to produce fringes that are related to contours of the reflecting surface, as disclosed, for example, in U.S. Pat. No. 4,139,302. As illustrated in this reference, the fringe pattern for study of surfaces is commonly recorded by photography for analysis. U.S. Pat. No. 4,169,980 discloses, alternatively, use of video camera detection and circuitry for locating centers of fringes in an interference pattern.

Interferometry for positioning of an object is commonly based on the well known Michelson principles, in which a beam is split into two beams that are reflected and recombined. Differences in beam paths result in fringes. For example, in U.S. Pat. No. 4,436,424, an angled diffraction grating reflects one of the beams and is mounted on a carriage that is moved transversely to vary the reflected path length. A changing fringe pattern thereby provides a measurement of the transverse movement. In the system of U.S. Pat. No. 3,588,462, a pair of diffraction gratings is used to generate a fringe pattern associated with movement. In these applications the diffraction gratings are used for reflecting the radiation and not for their alternative use which is dispersion of radiation into separated wavelengths.

U.S. Pat. No. 3,588,254 teaches a combination of two systems each effecting interferometry of radiation from the same tunable crystal laser. The first system is associated with a positioning table and utilizes a Michelson interferometer with laser input, fringe detection associated with the position of the table, and feedback to a motor to control positioning of the table. The second system incorporates a second interferometer with a motorized carriage reflector, detecting a split-off beam from the laser. Any changes in fringe pattern of the second interferometer are associated with temperature changes in the system. Feedback from the changes in pattern is directed to regulation of the laser frequency with the laser-driving heater, so as to compensate the laser wavelength for the temperature changes.

A solid state diode laser powered with a controllable injection current to vary laser frequency is taught in U.S. Pat. No. 4,410,273. The injection current is varied cyclically, and the laser output is split and directed through sample and reference cells, the two beams being detected separately. A feedback to the current control centers the laser frequency on a associated absorption feature of the reference cell.

SUMMARY OF THE INVENTION

An object of the present invention is to provide a novel apparatus for measuring variations in thickness associated with an optical interference element such as an etalon. Another object is to provide a novel method utilizing such apparatus. Further objects are to provide a relatively simple apparatus and method for measuring such variations, for example for routine checking of optical elements for imperfections.

Foregoing and other objects are achieved, at least in part, by an optical apparatus comprising a wavelength-tunable source of radiation disposed to direct substantially monochromatic light radiation having a path wavelength along a predetermined optical path. An optical interference element is supported in the optical path so as to be receptive of the path wavelength and thereby effect an interference fringe pattern representative of thickness variations associated with the interference element. A tuning means is operatively connected to the tunable source so as to vary the path wavelength to the interference element and thereby vary positioning of the fringe pattern across the interference element. A microscope, or other means for detecting the fringes, is disposed so as to be focused on the interference element. A calibrated reticule associated with the microscope allows microscope observation of the detected positional changes in the fringe pattern. A measuring means is associated with the tunable source for providing a measure representative of variation of the path wavelength. The measure is thereby further representative of thickness variation across the interference element.

In a particular embodiment of the invention, the tunable source comprises a light source of broad-band light radiation, and a dispersion means such as a diffraction grating receptive of the light radiation for dispersing an angular spread of wavelength-dispersed radiation. The dispersion means is positioned to direct a portion of the dispersed radiation into the optical path at the path wavelength such that the path wavelength is dependent on angular orientation of the dispersion means and the light source which preferably are in fixed relationship. The angular orientation is varied so as to vary the path wavelength to the interference element and thereby vary positioning of the fringe pattern across the interference element. The measuring means comprises means for determining a measure of variation of orientation associated with the detected positional changes, whereby the measure is representative of thickness variation across the interference element. In an advantageous embodiment, the system of the diffraction grating and the light source is mounted on an axle, a lever arm is affixed to the axle, and a micrometer is held in contact with the lever arm. Adjustment of the micrometer varies the angular orientation while providing the measure of variation of orientation.

Objects are also achieved by a method utilizing the foregoing apparatus. The method comprises mounting an optical interference element, detecting an initial position of the fringe pattern associated with the interference element, operating the tuning means to vary the wavelength of the tunable source and thereby reposition the fringe pattern to a second position across the interference element, and determining a measure with the measuring means corresponding to a difference between the initial position and the second position. As indicated above, the measure is representative of thickness variation across the interference element.

BRIEF DESCRIPTION OF THE DRAWINGS

FIG. 1 is a schematic drawing of an embodiment of the invention.

FIGS. 2a and 2b are successive views of interference fringes in an interference element using the invention.

DETAILED DESCRIPTION OF THE INVENTION

Figure 3:
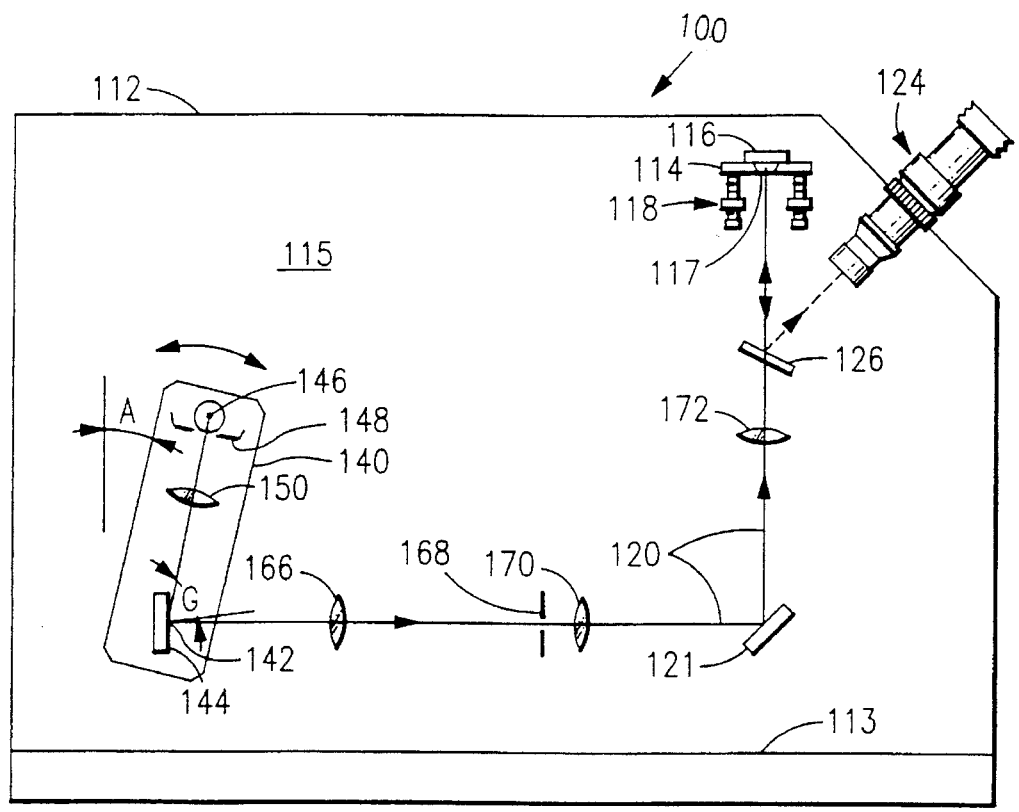
FIG. 3 is an elevation showing one side of an apparatus representing another embodiment of the invention.

Apparatus according to the invention is directed to detecting and measuring thickness variations associated with an optical interference element. The optical element particularly may be a Fabry-Perot etalon normally used for producing interference fringes in an optical instrument. A precision etalon requires flat, parallel surfaces. Alternatively the element may be a flat, convex or concave mirror or lens surface. In the latter alternative, the surface is placed on an optically flat surface of a transparent member to form a thin film of air, and thickness variations across the film can be detected for purposes of analyzing surface irregularities.

FIG. 1 shows an embodiment of an apparatus 10 illustrating the invention. Most components are mounted on a base structure 12. A sample support 14 is mounted accessibly near an upper corner, for supporting an etalon 16 or the like. This support should have leveling screws 18 for adjusting an upper surface of the support so that the etalon mounted thereon is accurately perpendicular to an optical path 20 leading to the etalon. A narrow-band wavelength of light, preferably nearly monochromatic, is directed via a folding mirror 21 on the optical path 20 from a tunable source 22 of radiation such as a laser or monochromator located at an opposite corner of the base structure. FIG. 1 particularly illustrates schematically the use of a tunable laser. Such a laser may be, for example, a crystal laser with a variable output wavelength driven by a heater and selectively tuned by temperature control of the heater, as disclosed in the aforementioned U.S. Pat. No. 3,588,254. Another example is a solid state diode laser powered with a controllable injection current, as disclosed in the aforementioned U.S. Pat. No. 4,410,273.

A low power (e.g. 10×) microscope 24 is mounted at a convenient angle spaced from the sample holder 14. A beam splitter 26, which may be a simple glass plate, is inserted in the optical path 20 so that the microscope can be focused toward the etalon 16. The term "beam splitter" is used conventionally herein to mean a partially reflective element or, more specifically for the present case, an element that passes through radiation to the etalon and reflects return radiation to the microscope. The splitter is oriented at an angle so as to allow focussing of the microscope onto the sample via reflection off the splitter, thus providing for observation of the sample through the microscope. A beam splitter in the optical path is preferable for optimum views of the fringes perpendicular to the etalon. However, an alternative is a reflective mirror just outside of the optical path, or in some cases the fringes may be observed directly, without the splitter, from either side of the etalon.

By way of well known optical phenomena, a "Fabry-Perot" interference pattern is effected at the etalon by multiple reflections of the narrow-band radiation between the two surfaces of the etalon. If the flatness and parallelism of the surfaces are perfect, the intensity at the etalon as seen through the microscope will be uniform and depend on the path wavelength and the exact thickness of the etalon. If there is any variation of thickness, due to wedge shape and/or variations in flatness, an optical interference fringe pattern will be seen through the microscope focused on the fringes. The fringes will be parallel if the etalon is wedge shaped, and circular or oval if the etalon has a peak or depression in a surface. FIG. 2a illustrates one dark fringe 28 as seen through the microscope. A reticule 30 is preferably included in the microscope 24 with calibrated lines 32 so that the position of the fringe across the surface of the etalon may be observed by eye. Alternatively a photodetection system may be utilized to detect and display the fringe positions, for example as taught in the aforementioned U.S. Pat. No. 4,169,980.

A conventional or desired wavelength tuning means 34 is connected operatively to the laser (or other tunable monochromatic source), and is used to vary the wavelength on the optical path to the etalon. This will displace the location of the fringe or fringes across the surface of the etalon by an amount that depends on the relative change in thickness of the etalon across the surface. The change in wavelength of the beam may be measured directly (by a detector or other means not shown), and the change in thickness then calculated with basic principles of optics. Preferably and much more conveniently, the tuning means is calibrated to provide a measure of change in wavelength, for example, a tuning knob 36 on the tuner may be calibrated directly in wavelength. Most preferably, the tuning means is calibrated so as to read directly, or at least in simple proportion to, changes in relative thickness of the etalon. Such recalibration may be translated from wavelength calibration by basic principles of optics well known to those skilled in the art.

Figure 4:
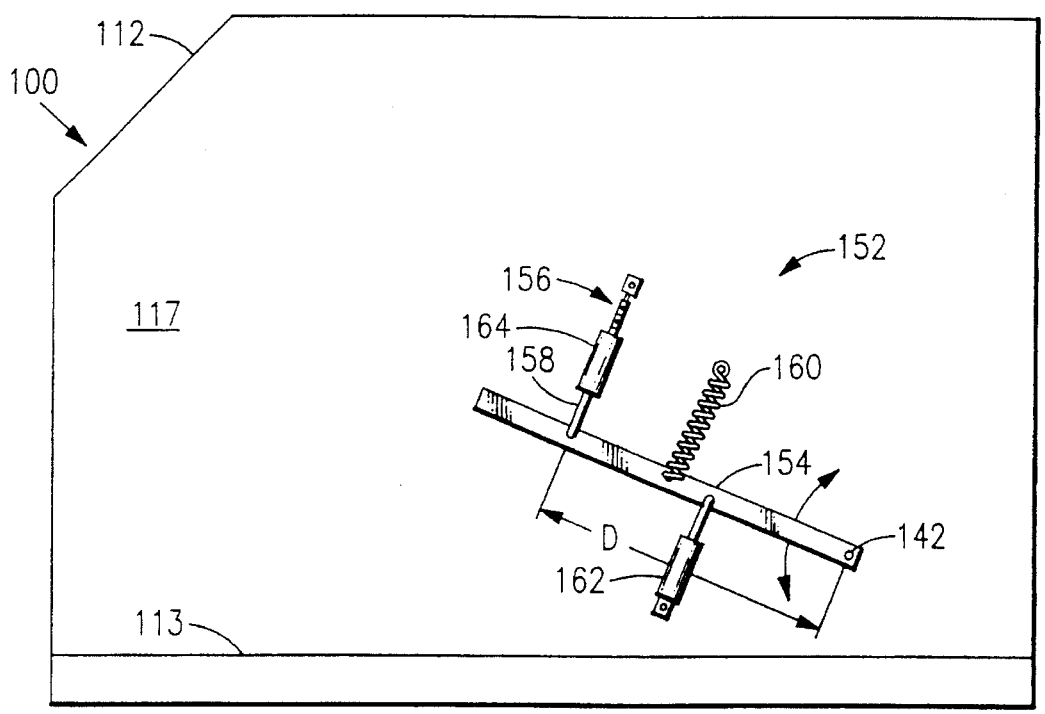
FIG. 4 is an elevation showing the other side of the apparatus of FIG. 3.

FIGS. 3 and 4 illustrate an apparatus 100 for a preferred embodiment of the invention, being an arrangement of components that allows a particularly convenient use by an operator. It will be appreciated that other arrangements of similar components may be organized as desired, for example to adapt to different conditions of physical location. A base structure 112 in the form of a vertical plate is mounted on a foundation platform 113. A sample support 114 with leveling screws 118 is mounted near the upper edge of one side 115 of the plate (FIG. 3). An etalon 116 or other sample optical interference element to be tested is placed on the support. A central orifice 117 of a size such as 1 cm through the support allows a suitable area of the element to be tested. In the case of a single surface to be tested, the support includes a transparent optical flat for contacting the surface to effect an air flow therebetween constituting the interference element.

A supporting member 140, located on the same side of the plate 112 and generally diagonally opposite the sample holder 114, has an axle 142 affixed thereto and extending rotatably on a bearing (not shown) through the plate so that the angular orientation A of the supporting member may be varied with respect to the plate. A flat reflective diffraction grating 144 or other wavelength dispersion means, serving as a scannable monochromator, is mounted on the support member 140. The axis of rotation for the axle 142 lies centrally across the dispersing surface of the grating, with the grooves in the grating being perpendicular to the vertical plate 112. The grating preferably has a groove spacing which is nominally equal to the wavelength range utilized, for example 555 nm.

A broad-band light source 146 such as a tungsten halogen lamp is also mounted on the supporting member 140. A light shield 148 with an orifice is disposed near the source, but the lamp filament can serve as the source aperture. Light from the source is collimated by a lens 150 so as to be incident onto the grating 144 at a near-grazing angle G, advantageously about 80° to 88°, for example 85°, from perpendicular. By orienting the grating surface approximately vertically, the angular spread of wavelength dispersed radiation utilized from the grating is directed generally horizontally, toward the right in FIG. 3. A wavelength range used in operation depends on the intended usage of the etalon; for example an infrared etalon would be tested advantageously in the red end of the visible spectrum between about 550 to 650 nm. With the grating having a groove spacing comparable to the wavelength, the grating is oriented nominally perpendicularly to a predetermined optical path 120 extending (rightwardly) from the grating 144.

A means for orienting the system of the light source and the diffraction means may be located wherever convenient, Advantageously the orienting means 152 is located on the second side 117 of the vertical plate 112 (FIG. 4). In a preferable embodiment of the orienting means, a lever arm 154 is affixed to the axle 142. A micrometer means 156 is attached to the plate 112 so that the spindle 158 of the micrometer contacts the lever arm at a distance D from the axle. A spring 160 attached from the plate to the arm holds the arm in contact with the spindle. A damper 162 may also be connected from the plate to the arm. Thus adjustment of the micrometer provides a precise adjustment of the orientation of the source-grating system 144,146, as well as a measure of the orientation A. The micrometer means may be conventional, for example, a simple mechanical micrometer 164 as shown, or one with a digital readout. In another arrangement, the micrometer means may comprise a screw adjustment for the arm position (similar to that shown) combined with a separate measuring gage, like a height gage, in contact with the arm. In a further alternative, a stepper motor with calibrated positioning may be used for the orienting means.

An achromatic lens 166 (FIG. 3) on the predetermined optical path 120 leading horizontally from the grating 144 is receptive of a band of the radiation dispersed from the grating and focusses the band to an input aperture 168. The slit width of the aperture preferably should determine a very narrow spectral bandpass, and should be set as a compromise between sufficient light intensity and optimal resolution; for example a slit width to set a bandpass of about 2 nm. The radiation continues on the path at a wavelength determined by the exact orientation of the grating system relative to the optical path. A third achromatic lens 170 collimates the beam from the slit 168, and the optical path continues vertically upwards to a fourth achromatic lens 172 via a folding mirror 121. The fourth lens, cooperatively with other lenses in the system, focusses the grating 144 at the path wavelength onto the sample optical element 116 on the holder 114, and the beam at the element also is collimated with respect to the source. It will be appreciated that curved mirrors may be used conventionally in place of these lenses as well as the first lens. In the same manner as for the embodiment of FIG. 1, a low power microscope 124 with a reticule is mounted on the plate, with a beam splitter 126 allowing for observation of fringes at the etalon.

Adjustment of the micrometer 164 (FIG. 4) will reorient the system of the light source 146 and the grating 144 (FIG. 3) so as to vary the wavelength to the etalon 116. This will displace the location of a fringe 28 across the surface from a first position 174 (FIG. 2a) to a second position 176 (FIG. 2b). The displacement L depends on the relative change in the thickness of the etalon across the surface. As the wavelength is varied, a selected portion of a fringe, for example the center or an edge of a selected dark fringe, will relocate to a position on the surface where the thickness (T) is different than that of the original location by an amount (dT) according to an approximate formula for the arrangement of FIG. 3:

$$dT/T = [S * dX]/[L * D]$$

where S = grating groove spacing, L = nominal wavelength of radiation, D = distance between axle and micrometer, and dX = change in micrometer setting. In a suitable example, S = 555 nm, L = 600 nm, and D = 8.4 inches (21.6 cm). Then:

$$dT/T = F * dX$$

where F = 0.1 and dX is in inches. By including a factor (F) of 0.1 (or other simple proportionality), any change dX in micrometer setting is effectively a direct measure of, or at least in a simple proportion to, a relative change in thickness across the surface of the etalon (or other similar optical interference element).

In operation, a selected area of surface is identified on the etalon surface (FIGS. 2a and 2b). The micrometer is adjusted initially to place a fringe 28 (linear or curved) at a first position located by a first calibrated line 32a in the reticule (FIG. 2a). The micrometer is then readjusted to relocate the same fringe to another position across the surface located by another line 32b in the reticule (FIG. 2b). The change in micrometer setting provides the change in thickness between the two positions. The calibrated reticule indicates the selected distance L across the surface having the thickness change.

The computation can be made more precise with a more exact formula based on ordinary principles of interferometry. However, for screening purposes, for example in checking a series of manufactured etalons, the foregoing is quite sufficient and convenient for an operator to utilize routinely.

The invention has been described for a preferable embodiment utilizing a grating and a light source mounted on a common support so as to rotate as a system. Other conventional or desired dispersion means in which wavelength depends on orientation may be utilized, such as a prism. Also, alternative arrangements may provide for either the light source or the dispersion element alone to be oriented so as to vary path wavelength, in place of both the grating and the source together, within the purview of the invention. In any such case, relating of the tuning means to the fringe location according to the invention provides for a single, direct way of checking etalons and the like for surface irregularities.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

We claim:

1. An optical apparatus for measuring variation in thickness associated with a Fabry-Perot etalon, comprising:

a light source of broad-band light radiation;

dispersion means receptive of the light radiation for dispersing an angular spread of wavelength-dispersed radiation, the dispersion means being positioned to direct a substantially monochromatic portion of the dispersed radiation along a predetermined optical path at a path wavelength, the path wavelength being dependent on angular orientation of the dispersion means;

support means for supporting a Fabry-Perot etalon in the optical path, the etalon being receptive of the path wavelength to thereby effect an interference fringe pattern across the etalon representative of thickness variations of the etalon;

orienting means for varying the angular orientation of the dispersion means so as to vary the path wavelength to the etalon and thereby vary positioning of the fringe pattern across the etalon;

observation means for allowing observation of variations in positioning of the fringe pattern across the etalon associated with varying the angular orientation; and measuring means for providing a measure representative of orientation associated with the positioning, the measure being calibrated directly as variation in thickness of the etalon associated with variations in positioning of the fringe pattern across the interference element.

2. The apparatus of claim 1 further comprising a base structure with the support means mounted thereon, a supporting member for supporting the dispersion means and the light source in relative fixed relationship, and an axle affixed to the supporting member for the angular rotation, the axle being rotationally mounted on the base structure so as to align the dispersion means on the optical path, and the orienting means being operatively connected to the supporting member.

3. The apparatus of claim 2 wherein the orienting means comprises a lever arm affixed to the axle, and a micrometer means mounted on the base structure in contact with the lever arm such that adjustment of the micrometer means varies the angular orientation while providing the measure of variation of thickness.

4. The apparatus of claim 3 wherein the lever arm has a length from the axle to the micrometer means predetermined cooperatively with calibrated readings of the micrometer means so that a difference in readings constitutes the measure of variation of thickness.

5. The apparatus of claim 4 wherein the observation means comprises a microscope mounted on the base structure so as to be focused to the interference element, and a calibrated reticule associated with the microscope so as to allow microscope observation of positional changes in the fringe pattern across the interference element.

6. The apparatus of claim 5 wherein the observation means further comprises a beam splitter disposed in the optical path and oriented cooperatively with the microscope and the interference element such that the fringe pattern is observable through the microscope via the beam splitter.

7. The apparatus of claim 5 wherein the supporting member comprises a vertically mounted plate with a first side and a second side, the support means and the microscope being mounted on the first side, the micrometer means being mounted on the second side, and the axle extending through the plate from the first side to the second side with the supporting member situated on the first side and the lever arm situated on the second side.

8. A method for measuring variations in thickness of a Fabry-Perot etalon by utilizing the apparatus of claim 5, the method comprising mounting a Fabry-Perot etalon on the support means, observing with respect to the reticule through the microscope an initial position of the fringe pattern associated with the etalon and an initial setting of the micrometer, reading the initial setting, adjusting the micrometer to a second setting while further observing the fringe pattern so as to change the angular orientation and thereby reposition the fringe pattern to a second position across the etalon, reading the second setting, and determining the difference between the initial setting and the second setting, whereby the difference is the measure of the thickness variation between the first position and the second position of the fringe pattern across the etalon.

9. The apparatus of claim 2 wherein the dispersion means comprises a dispersion grating with groove spacing nominally equal to the path wavelength, the grating surface being oriented generally perpendicularly to the optical path, and the light source being positioned so as provide near-grazing incidence of the light radiation on the grating.

10. The apparatus of claim 9 further comprising a collimating means disposed to collimate radiation from the light source to the grating, and a focussing means in the optical path configured to collimate radiation to the interference element with the grating being focused on the interference element.

11. The apparatus of claim 10 wherein the collimating means is a collimating lens, and the focussing means comprises a train of lenses.

12. The apparatus of claim 11 further comprising an aperture disposed in the optical path so as to selectively pass the path wavelength to the interference element.

13. The apparatus of claim 1 further comprising a base structure with the support means mounted thereon, and a supporting member for supporting the dispersion means and the light source in relative fixed relationship, wherein the observation means comprises a microscope mounted on the base structure so as to be focused to the interference element, and a calibrated reticule associated with the microscope so as to allow microscope observation of positional changes in the fringe pattern, and the apparatus further comprises an axle affixed to the supporting member for the angular rotation, the axle being rotationally mounted on the base structure so as to align the dispersion means on the optical path, the orienting means comprising a lever arm affixed to the axle, and a micrometer means mounted on the base structure in contact with the lever arm such that adjustment of the micrometer means varies the angular orientation while providing the measure of variation of orientation, the lever arm having a length from the axle to the micrometer means predetermined cooperatively with calibrated readings of the micrometer means so that a difference in readings constitutes the measure of variation of thickness.

14. The apparatus of claim 13 wherein the dispersion means comprises a dispersion grating with groove spacing nominally equal to the path wavelength, the grating surface being oriented nominally perpendicularly to the optical path, and the light source being positioned so as provide near-grazing incidence of the light radiation on the grating, and the apparatus further comprises a collimating means disposed to collimate radiation from the light source to the grating, and a focussing means in the optical path configured to collimate radiation to the interference element with the grating being focused on the interference element.

15. A method for measuring variations in thickness of a Fabry-Perot etalon by utilizing the apparatus of claim 1, the method comprising mounting a Fabry-Perot etalon on the support means, observing an initial position of the fringe pattern associated with the etalon, determining an initial angular orientation corresponding with the initial position, varying the angular orientation to a second angular orientation and thereby repositioning the fringe pattern to a second position across the etalon, and determining a measure corresponding to a difference between the initial orientation and the second orientation, whereby the measure directly provides the thickness variation across the etalon.

* * * * *